United States Patent
Nagumo

(10) Patent No.: US 11,178,298 B2
(45) Date of Patent: Nov. 16, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Jun Nagumo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/776,506

(22) Filed: Jan. 30, 2020

(65) Prior Publication Data

US 2021/0037152 A1 Feb. 4, 2021

(30) Foreign Application Priority Data

Jul. 29, 2019 (JP) .............................. JP2019-138420

(51) Int. Cl.
*H04N 1/00* (2006.01)
*G06F 3/0482* (2013.01)
*G06F 3/0481* (2013.01)

(52) U.S. Cl.
CPC ....... *H04N 1/00474* (2013.01); *G06F 3/0482* (2013.01); *G06F 3/04817* (2013.01); *H04N 1/00411* (2013.01)

(58) Field of Classification Search
CPC ............ H04N 1/00474; H04N 1/00411; G06F 3/0482; G06F 3/04817
See application file for complete search history.

(56) References Cited

U.S. PATENT DOCUMENTS

| | | | | |
|---|---|---|---|---|
| 7,304,677 | B2* | 12/2007 | Keelan | H04N 5/232933 348/333.01 |
| 7,844,916 | B2* | 11/2010 | Yamanaka | H04N 5/44513 715/786 |
| 8,059,182 | B2* | 11/2011 | Ota | H04N 5/232933 348/333.02 |
| 8,670,002 | B2* | 3/2014 | Kim | H04M 1/72403 345/658 |
| 9,052,927 | B2* | 6/2015 | Baek | G06F 9/451 |
| 9,357,088 | B2* | 5/2016 | Kuroyanagi | H04N 1/00503 |
| 9,521,244 | B2* | 12/2016 | Choi | H04M 1/72469 |
| 9,585,089 | B2* | 2/2017 | Onohara | H04W 4/80 |
| 10,324,588 | B2* | 6/2019 | Kanemoto | G06F 3/04817 |
| 2008/0046931 | A1* | 2/2008 | Corbett | H04N 21/482 725/52 |

(Continued)

FOREIGN PATENT DOCUMENTS

| | | | | |
|---|---|---|---|---|
| JP | 2000222333 | A * | 8/2000 | ......... H04N 1/00424 |
| JP | 2013003749 | | 1/2013 | |

(Continued)

*Primary Examiner* — Ted W Barnes
(74) *Attorney, Agent, or Firm* — JCIPRNET

(57) ABSTRACT

An information processing apparatus includes first and second switching units. The first switching unit switches, when a first icon displayed on a screen is selected, the first icon to a second icon on the screen. The first icon is used for executing a first function. The second icon is used for executing a second function different from the first function. The second switching unit switches the second icon to a third icon on the screen in accordance with a state of a device. The third icon is used for executing a third function.

11 Claims, 12 Drawing Sheets

(56) References Cited

U.S. PATENT DOCUMENTS

| | | | | |
|---|---|---|---|---|
| 2009/0009479 | A1* | 1/2009 | Sawyer | G06F 3/023 345/169 |
| 2010/0017731 | A1* | 1/2010 | Taira | G06F 3/038 715/765 |
| 2010/0088643 | A1* | 4/2010 | Ota | H04N 5/232933 715/835 |
| 2011/0016390 | A1* | 1/2011 | Oh | G06F 3/0486 715/702 |
| 2011/0035691 | A1* | 2/2011 | Kim | G06F 3/04817 715/765 |
| 2012/0044139 | A1* | 2/2012 | Kim | G06F 3/0425 345/157 |
| 2012/0061217 | A1* | 3/2012 | Chiang | G06F 1/1626 200/310 |
| 2012/0263345 | A1* | 10/2012 | Watanabe | H04N 1/00419 382/100 |
| 2013/0019158 | A1* | 1/2013 | Watanabe | G06F 3/03545 715/230 |
| 2013/0163023 | A1* | 6/2013 | Tomono | H04N 1/00474 358/1.13 |
| 2013/0318585 | A1* | 11/2013 | Hosoda | H04L 63/0815 726/7 |
| 2014/0317500 | A1* | 10/2014 | Kim | G06F 3/0482 715/702 |
| 2014/0376054 | A1* | 12/2014 | Kuroyanagi | H04N 1/00482 358/1.15 |
| 2015/0026632 | A1* | 1/2015 | Wakabayashi | G06F 3/0483 715/776 |
| 2015/0067800 | A1* | 3/2015 | Hosoda | H04L 63/083 726/6 |
| 2015/0177948 | A1* | 6/2015 | Sasaki | G06F 3/04817 715/740 |
| 2015/0277692 | A1* | 10/2015 | Liu | G06F 3/04817 715/835 |
| 2015/0346942 | A1* | 12/2015 | Oren | G06F 8/10 715/769 |
| 2016/0041684 | A1* | 2/2016 | Rhee | H04N 5/23216 345/173 |
| 2016/0352932 | A1* | 12/2016 | Asai | H04N 1/00347 |
| 2016/0354263 | A1* | 12/2016 | Furman | A61G 7/018 |
| 2016/0357392 | A1* | 12/2016 | Hyun | G06F 3/0488 |
| 2017/0060600 | A1* | 3/2017 | Niehaus | G06F 9/453 |
| 2019/0227679 | A1* | 7/2019 | Sakai | G06F 3/04886 |
| 2020/0099856 | A1* | 3/2020 | Yun | H04N 5/23227 |
| 2020/0167060 | A1* | 5/2020 | Sun | G06F 3/04847 |
| 2020/0267318 | A1* | 8/2020 | Lee | H04N 5/23245 |

FOREIGN PATENT DOCUMENTS

| | | | |
|---|---|---|---|
| JP | 2013003749 A | * | 1/2013 |
| JP | 2015099420 A | * | 5/2015 |
| JP | 6211904 | | 10/2017 |

* cited by examiner

| ICON (A) | FIRST SWITCHING | | SECOND SWITCHING | |
|---|---|---|---|---|
| | STATE | ICON (B) | STATE | ICON (C) |
| START COPY | DOCUMENT READING | PAUSE | IMAGE PRINTING | STOP |
| START PRINT | IMAGE GENERATING | PAUSE | IMAGE PRINTING | STOP |
| START FAX SENDING | DOCUMENT READING | PAUSE | IMAGE SENDING | STOP |
| ⋮ | ⋮ | ⋮ | ⋮ | ⋮ |

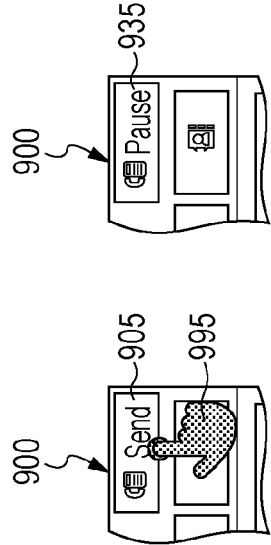
FIG. 9A
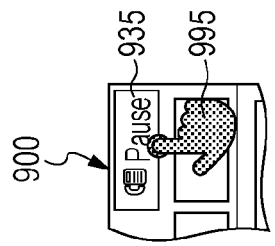
FIG. 9B
FIG. 9C
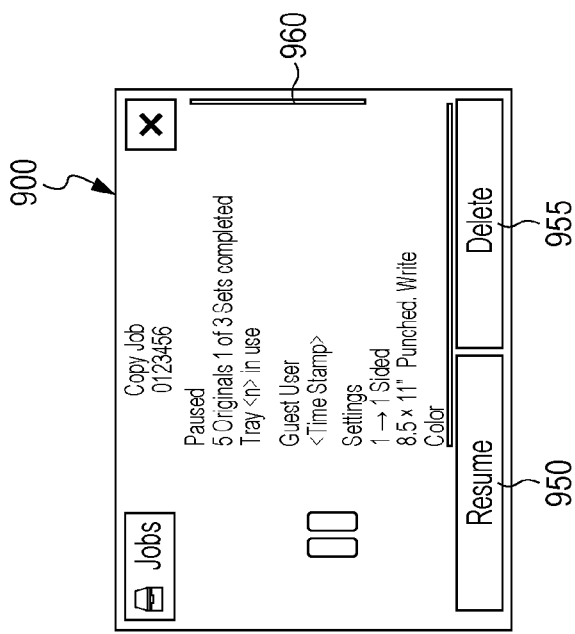
FIG. 9D
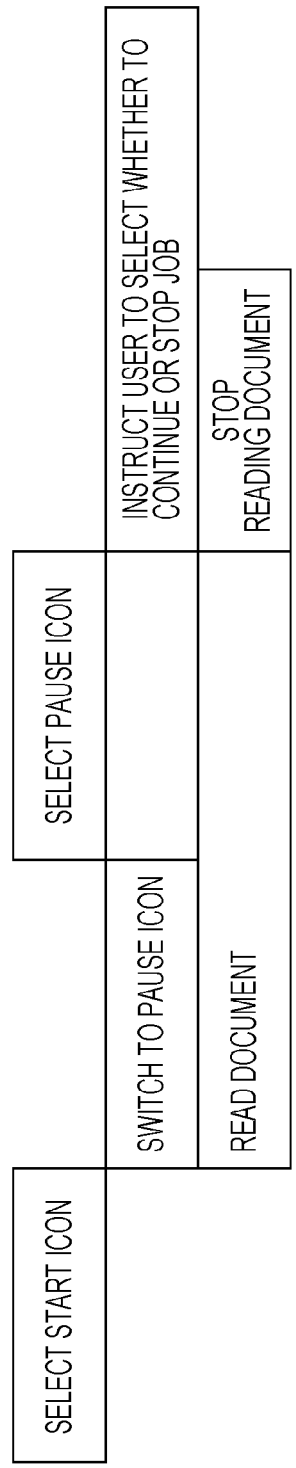
FIG. 9E

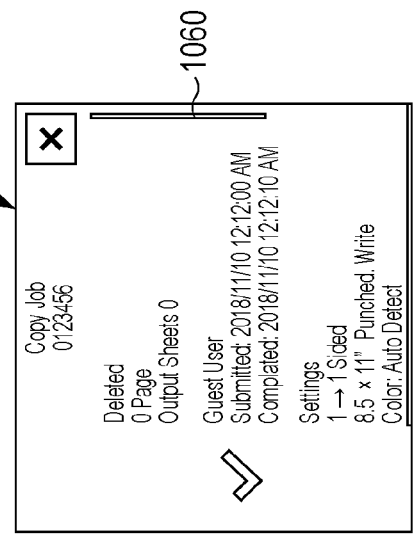
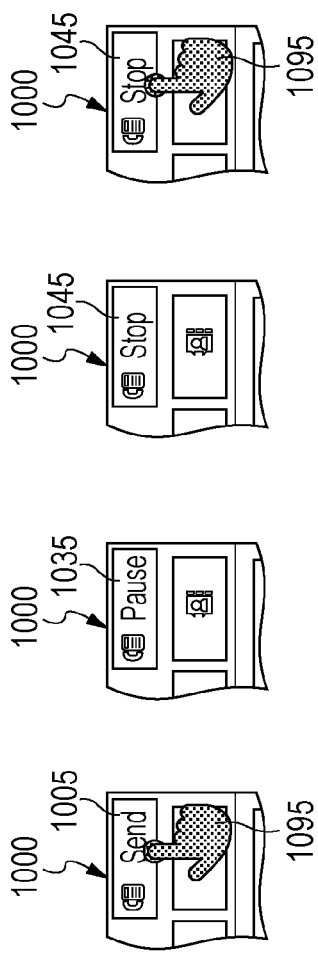

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-138420 filed Jul. 29, 2019.

BACKGROUND

(i) Technical Field

The present disclosure relates to an information processing apparatus and a non-transitory computer readable medium.

(ii) Related Art

Japanese Patent No. 6211904 discloses the following image processing apparatus. In this image processing apparatus, a first operation to be performed on a first button and a second operation to be performed on a second button, which is switched from the first button, are set as different types of operations. With this configuration, even if the first operation is performed on the second button by mistake, it is not received as the operation on the second button. The image processing apparatus includes an operation unit and a controller. The operation unit includes a display displaying buttons associated with functions and a touch sensor disposed on the display to receive an operation from the outside. Upon receiving an operation for pressing a first button displayed at a predetermined position of the display, the controller gives permission to execute first processing associated with the first button, and then, displays a second button at the position at which the first button is displayed. Then, when receiving an operation performed on the second button, which is different from the pressing operation on the first button, the controller gives an instruction to execute second processing associated with the second button, which cancels the permission to execute the first processing.

Japanese Unexamined Patent Application Publication No. 2013-003749 discloses the following operation device. In this operation device, when a predetermined input operation is received, another input operation is disabled for a predetermined time period, thereby preventing a user from performing a wrong operation. An example of the operation device is an image forming device. The image forming device includes a display, a copy key, a copy stop key, and a central processing unit (CPU). The copy key is displayed on the display. When an input operation for the copy key is received, the copy key operates to execute a corresponding function. The copy stop key is displayed on the display. When an input operation for the copy stop key is received, the copy stop key operates to execute a corresponding function, which is different from the function of the copy key. While the copy key is enabled, the copy stop key is disabled. While the copy key is displayed, the copy stop key is not displayed. At a first stage after an input operation for the copy key has been received, the CPU disables the copy key and the copy stop key, and displays the copy stop key but does not display the copy key. Thereafter, at a second stage, the CPU enables the copy stop key.

SUMMARY

When a user has selected a first icon displayed on a screen, the first icon is switched to a second icon for executing a second function. After the first icon is switched to the second icon, the state of a device may be changed to another state. If the user selects the second icon without knowing that the state of the device has been changed, processing which is not intended by the user may be executed.

Aspects of non-limiting embodiments of the present disclosure relate to an information processing apparatus and a non-transitory computer readable medium that are able to switch the second icon to a third icon on the screen in accordance with the state of the device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including first and second switching units. When a first icon displayed on a screen is selected, the first switching unit switches the first icon to a second icon on the screen. The first icon is used for executing a first function. The second icon is used for executing a second function different from the first function. The second switching unit switches the second icon to a third icon on the screen in accordance with a state of a device. The third icon is used for executing a third function.

BRIEF DESCRIPTION OF THE DRAWINGS

An exemplary embodiment of the present disclosure will be described in detail based on the following figures, wherein:

FIGS. 9A through 9E illustrate an example of processing in the exemplary embodiment;

FIGS. 10A through 10F illustrate an example of processing in the exemplary embodiment;

DETAILED DESCRIPTION

An exemplary embodiment of the disclosure will be described below with reference to the accompanying drawings.

Figure 1:
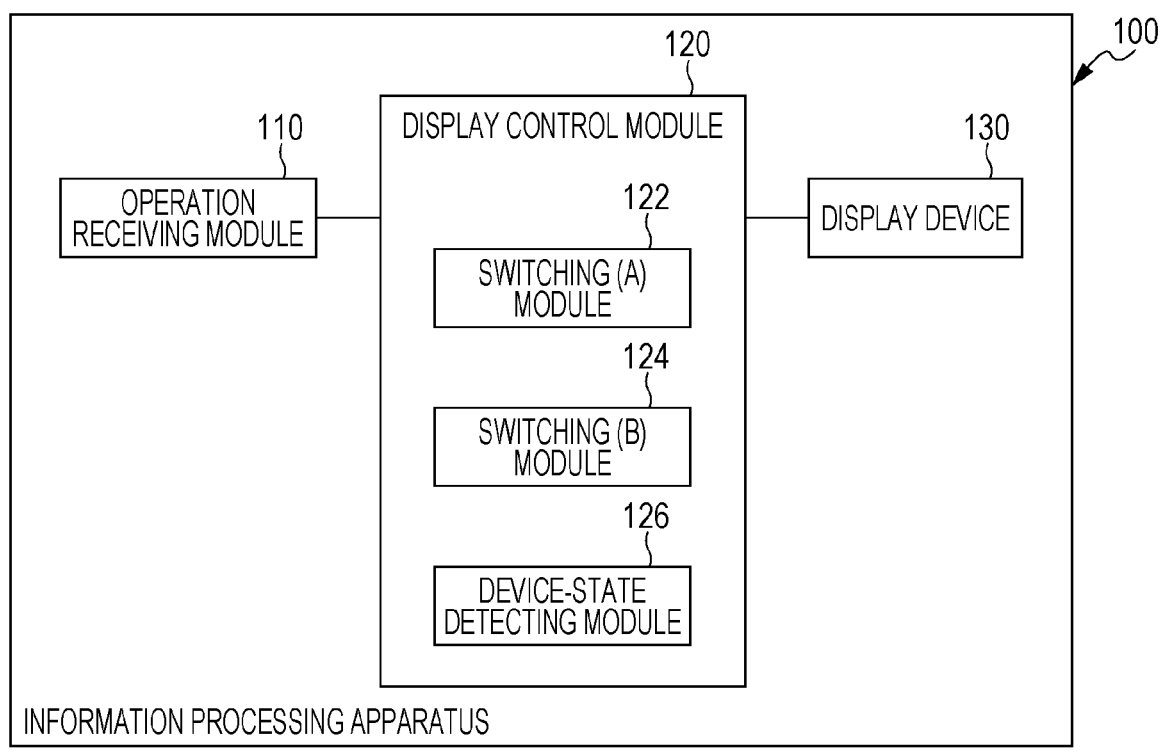
FIG. 1 is a block diagram illustrating conceptual modules forming an example of the configuration of the exemplary embodiment.

FIG. 1 is a block diagram illustrating conceptual modules forming an example of the configuration of the exemplary embodiment.

Generally, modules are software (computer programs) components or hardware components that can be logically separated from one another. The modules of the exemplary embodiment of the disclosure are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include a mere man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk drive, a random access memory (RAM), an external storage medium, a storage device using a communication network, and a register within a central processing unit (CPU).

An information processing apparatus 100 according to the exemplary embodiment includes a user interface function, and also includes an operation receiving module 110, a display control module 120, and a display device 130, as shown in FIG. 1.

As objects of the user interface, icons are used. Icons are objects that are displayed to allow a user to select one of them. Icons are represented by characters, symbols, graphics, and images. Icons may be represented by characters, symbols, graphics, and images combined with the shape, pattern, color, dynamic change, and blinking. An icon may be an object only constituted by characters, such as "Start" and "Stop". The shape may be the shape of an icon itself, such as a triangle, a square, and a circle. As dynamic change, flash and animated graphics may be used. If blinking is used, the appearance of an icon may be changed according to whether or not this icon blinks or by the blinking period or the interval of blinking.

The operation receiving module 110 is connected to the display control module 120. The operation receiving module 110 receives an operation performed by a user. The operation receiving module 110 may be a touchscreen which also serves as the display 130. A keyboard or mechanical buttons may be included in the operation receiving module 110.

The display device 130 is connected to the display control module 120. The display device 130 is a display, such as a liquid crystal display or an organic electroluminescence (EL) display, and displays icons and other information under the control of the display control module 120. As discussed above, the display device 130 may be a touchscreen which also serves as the operation receiving module 110. Icons on a touchscreen are also called software buttons.

The display control module 120 includes a switching (A) module 122, a switching (B) module 124, and a device-state detecting module 126, and is connected to the operation receiving module 110 and the display device 130. The display control module 120 controls the display state of the display device 130 in accordance with the operation received by the operation receiving module 110 or the state of a device.

When a first icon displayed on a screen is selected, the switching (A) module 122 switches the first icon to a second icon on the screen. The first icon is used for executing a first function, and the second icon is used for executing a second function different from the first function.

The switching (B) module 124 switches the second icon to a third icon on the screen in accordance with the state of a device. The third icon is used for executing a third function.

The device may be the information processing apparatus 100 itself or another device. If the device is the information processing apparatus 100, the information processing apparatus 100 is a user interface and also executes processing in accordance with the operation performed on the user interface. The processing executed by the information processing apparatus 100 includes jobs. If the device is other than the information processing apparatus 100, it may be a device connected to the information processing apparatus 100 via a communication network, and the information processing apparatus 100 has a user interface function of this device to cause the device to execute processing. For example, the device may be a printer or a television set, and the information processing apparatus 100 may be a smartphone operating the device.

The third function is a function at least different from the second function. The third function may be a function different from the first function.

If the device remains in a first state, which is a state to shift to another state as a result of the first icon being selected, the switching (B) module 124 may not switch the second icon to the third icon on the screen. That is, if the device remains in the first state, the switching (B) module 124 leaves the second icon being displayed.

If the device has shifted from the first state to a second state, the switching (B) module 124 may switch the second icon to the third icon on the screen.

As the second function or the third function, the switching (A) module 122 or the switching (B) module 124 may set a function of interrupting or stopping processing to be generated when the first icon is selected.

In this case, as a combination of functions to be set as the second and third functions, the following options are possible: (1) both the second and third functions are functions of interrupting processing; (2) both the second and third functions are functions of stopping processing; (3) the second function is a function of interrupting processing and the third function is a function of stopping processing; and (4) the second function is a function of stopping processing and the third function is a function of interrupting processing. Interrupting processing means temporarily stopping processing.

If, in addition to first processing, which is the processing to be generated when the first icon is selected, second processing different from the first processing is currently in the device, the switching (A) module 122 or the switching (B) module 124 may set a function of interrupting or stopping the first processing as the second function or the third function. "Second processing is currently in the device" refers to a state in which the second processing has already started in the device or is queued in the device.

The second processing is any processing other than the first processing to be generated when the first icon is selected. For example, the second processing may be: (1) processing generated in response to an operation performed by a user different from a user having selected the first icon; and (2) processing generated in response to an instruction from an external device connected to the device via a communication network.

If, in addition to the first processing, which is the processing to be generated when the first icon is selected, the second processing different from the first processing is currently in the device, the switching (A) module 122 or the switching (B) module 124 may set a function of interrupting or stopping the second processing as the second function or the third function.

It may also be possible to set the condition that the first processing and the second processing use the same function in the device. This condition may be imposed when the device has only one module executing a target function and the module is able to handle only one operation at one time. Under this condition, if the first processing and the second processing are generated, one of them has to be interrupted or stopped.

Examples of "operations using the same function" are as follows.

(1) Two operations are the same processing. For example, the first processing is print processing and the second processing is also print processing.

(2) Two operations are different operations but use the same function. For example, the first processing is print processing and the second processing is copy processing, and they both use a print function.

If the first processing and the second processing do not use the same function in the device, a function of interrupting or stopping the second processing may not be set as the second function or the third function. If the first processing and the second processing do not use the same function in the device, they can be executed in parallel and it is not necessary to interrupt or stop the second processing.

The device-state detecting module 126 detects the state of a subject device, and supplies the detection result to the switching (A) module 122 or the switching (B) module 124. For example, the device-state detecting module 126 detects whether the second processing is currently in the device as well as the first processing. The device-state detecting module 126 also detects an operation that the device is performing, such as document reading and calling and performing communication.

Figure 2A:
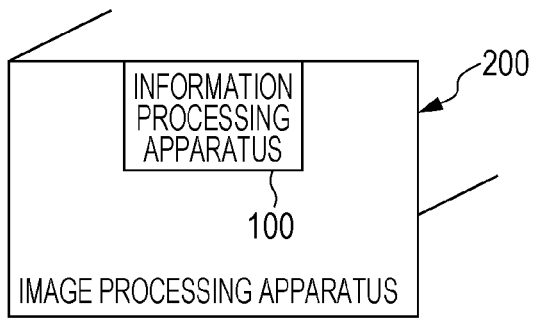
FIGS. 2A, 2B, and 2C illustrate examples of system configurations using the exemplary embodiment.
Figure 2B:
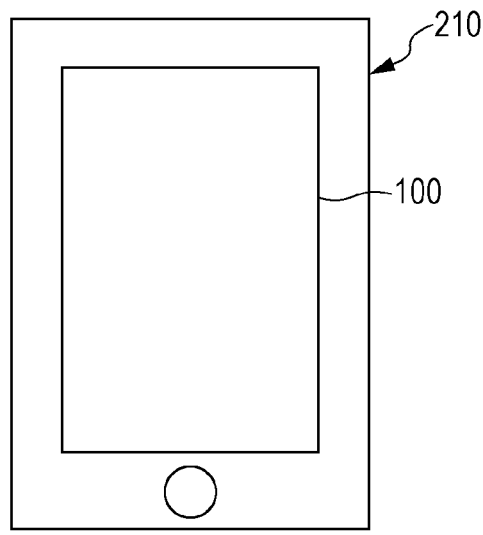
Figure 2C:
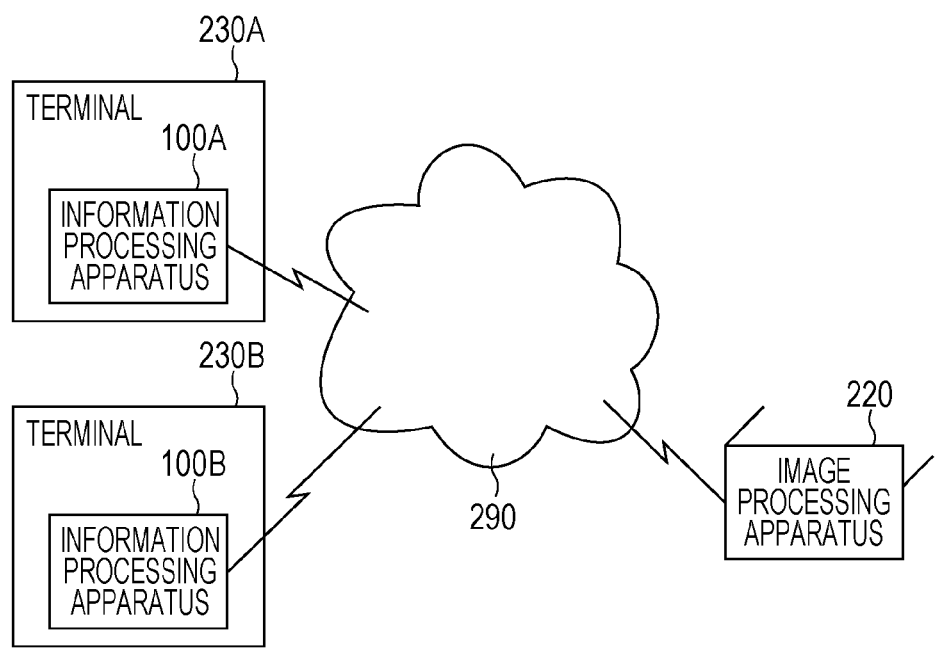

FIGS. 2A through 2C illustrate examples of system configurations using the exemplary embodiment.

FIG. 2A illustrates an example of the configuration in which the information processing apparatus 100 is integrated in an image processing apparatus 200. In this case, a device subjected to processing in the exemplary embodiment is the image processing apparatus 200. The image processing apparatus 200 is a copying machine, a fax machine, a scanner, a printer, or a multifunction device. The multifunction device is an image processing apparatus having at least two of the functions as a scanner, a printer, a copying machine, and a fax machine. Examples of the state of the device are document reading, image generating, image printing, and image sending.

FIG. 2B illustrates an example of the configuration in which the information processing apparatus 100 is integrated in a mobile information terminal 210. In this case, a device subjected to processing in the exemplary embodiment is the mobile information terminal 210. The mobile information terminal 210 is a smartphone, for example. Examples of the state of the device are executing application processing and performing communication.

FIG. 2C illustrates an example of the configuration in which the information processing apparatus 100 is integrated in a terminal 230 to control an image processing apparatus 220. In this case, a device subjected to processing in the exemplary embodiment is the image processing apparatus 220. The image processing apparatus 220 is a copying machine, a fax machine, a scanner, a printer, or a multifunction device, for example. Examples of the state of the device are document reading, image generating, image printing, and image sending.

An information processing apparatus 100A in a terminal 230A, an information processing apparatus 100B in a terminal 230B, and the image processing apparatus 220 are connected to each other via a communication network 290. A user of the terminal 230 operates the image processing apparatus 220 via the communication network 290.

Figure 3A:
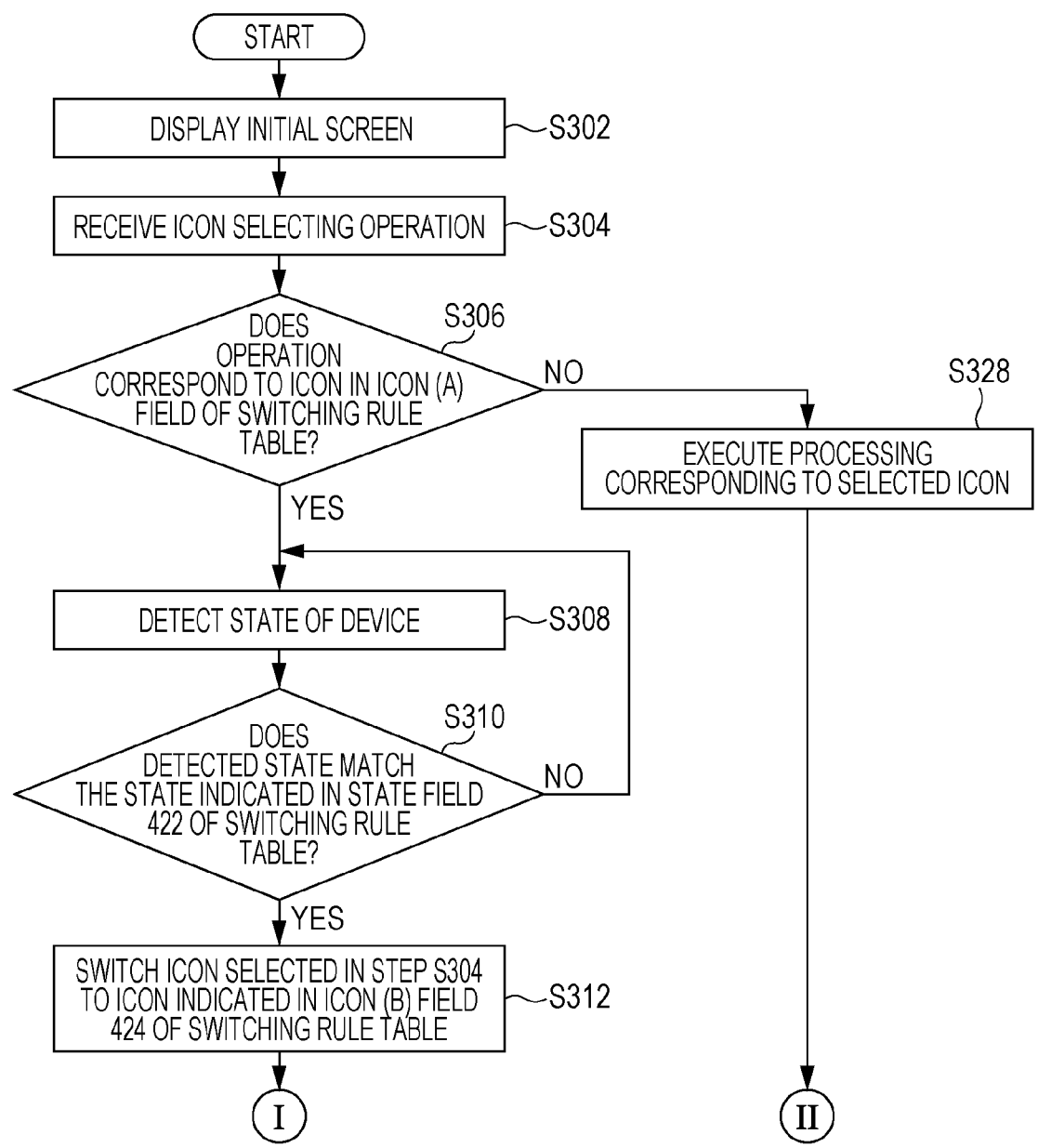
FIGS. 3A and 3B are a flowchart illustrating an example of processing in the exemplary embodiment.
Figure 3B:
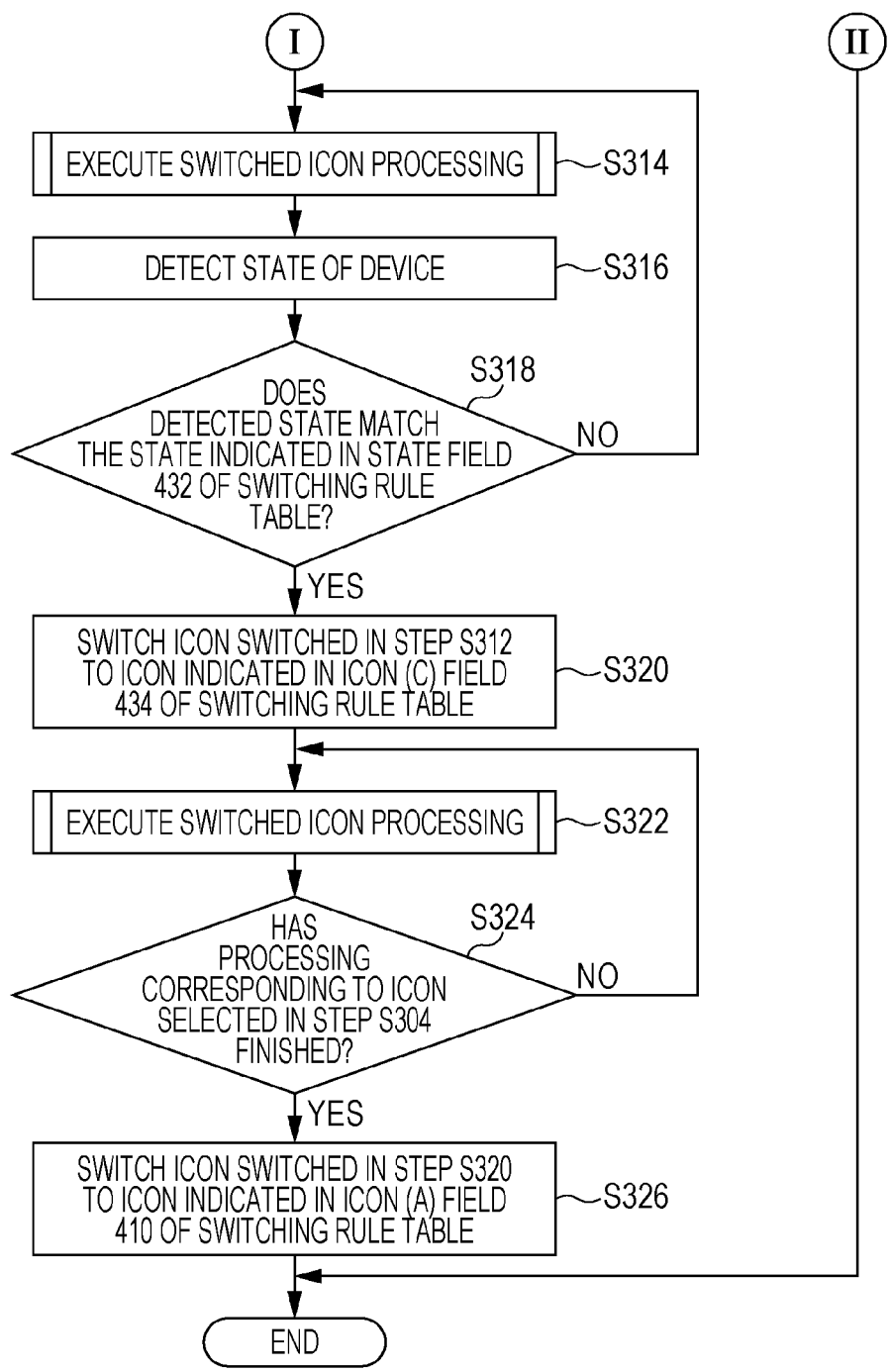

FIGS. 3A and 3B are a flowchart illustrating an example of processing in the exemplary embodiment.

In step S302, the initial screen is displayed on the display device 130. The initial screen may be a menu screen for instructing a user to select processing to be executed.

In step S304, a selecting operation of an icon on the initial screen is received. If the display device 130 is a touchscreen, a user can select an icon by touching it with a finger or a mouse.

In step S306, it is judged whether the operation received in step S304 is an operation corresponding to an icon (A) in an icon (A) field 410 of a switching rule table 400. If the operation corresponds to an icon (A) in the icon (A) field 410, the process proceeds to step S308. If the operation does not correspond to an icon (A) in the icon (A) field 410, the process proceeds to step S328.

Figures 4, 5:
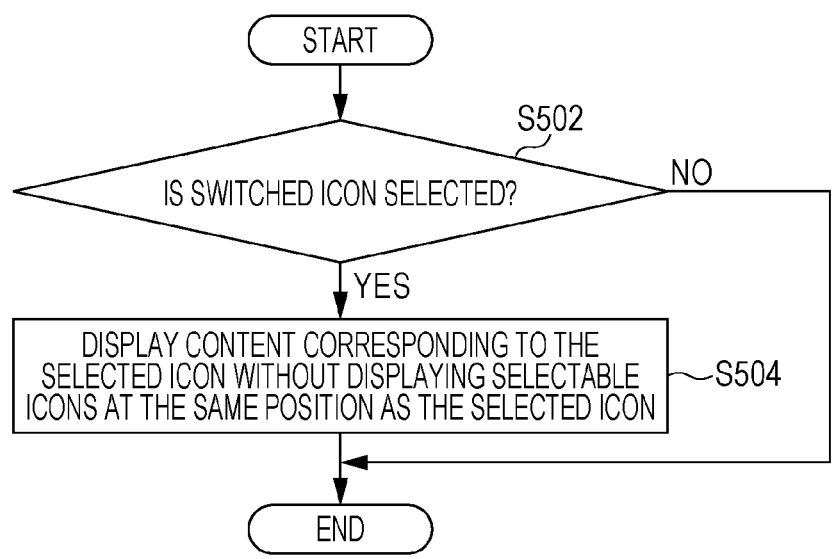
FIG. 4 illustrates an example of the data structure of a switching rule table.
FIG. 5 is a flowchart illustrating an example of processing in the exemplary embodiment.

FIG. 4 illustrates an example of the data structure of the switching rule table 400. The switching rule table 400 stores subject icons (A), conditions for switching icons (A) to icons (B), icons (B) switched from icons (A), conditions for switching icons (B) to icons (C), and icons (C) switched from icons (B). More specifically, the switching rule table 400 has the icon (A) field 410, a first switching field 420, and a second switching filed 430. The first switching field 420 has a state field 422 and an icon (B) field 424. The second switching field 430 has a state field 432 and an icon (C) field 434. The icon (A) field 410 indicates icons (A). The icons (A) are icons in the initial state. In the first switching field 420, the state field 422 indicates the conditions concerning first switching, and the icon (B) field 424 indicates icons (B) switched from the corresponding icons (A). More specifically, the state field 422 indicates the state of the subject device, which is the condition for switching the icon (A) to the icon (B). In the second switching field 430, the state field 432 indicates the conditions concerning second switching, and the icon (C) field 434 indicates icons (C) switched from the corresponding icons (B). More specifically, the state field 432 indicates the state of the subject device, which is the condition for switching the icon (B) to the icon (C).

The switching rule table 400 is used as follows.

When an icon (A) in the icon (A) field 410 is selected by a user, and then, when the subject device has entered a processing state indicated in the state field 422 of the first switching field 420, the displayed icon (A) is switched to the corresponding icon (B) in the icon (B) field 424. When the subject device has entered a processing state indicated in the state field 432 of the second switching field 430, the displayed icon (B) is switched to the corresponding icon (C) in the icon (C) field 434.

In step S308, the device-state detecting module 126 detects the state of the device. The device has already started to execute processing corresponding to the icon selected in step S304, and it is possible that the state of the device changes to another state.

In step S310, it is judged whether the detected state matches the state indicated in the state field 422 of the switching rule table 400. If the detected state matches the state indicated in the state field 422, the process proceeds to step S312. If the detected state does not match the state indicated in the state field 422, the process returns to step S308.

In step S312, the icon selected in step S304 is switched to the icon (B) indicated in the icon (B) field 424 of the switching rule table 400.

Figure 6:
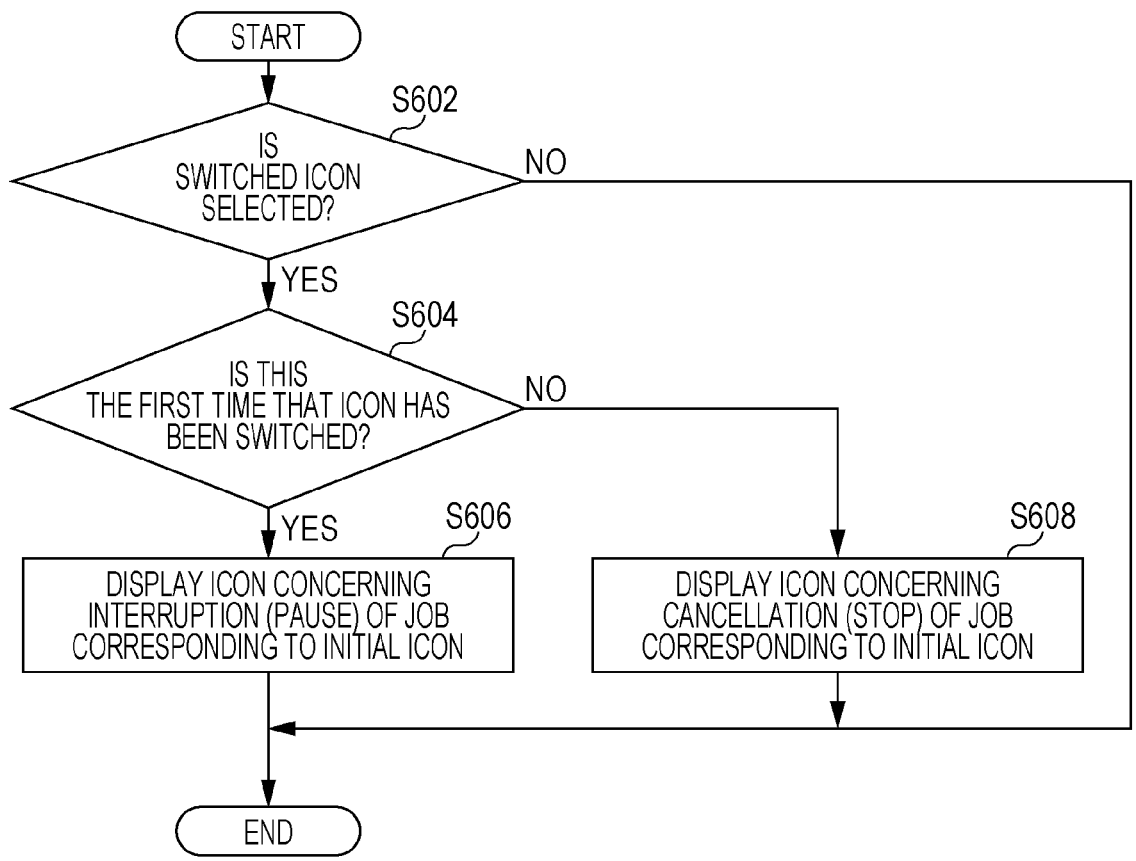
FIG. 6 is a flowchart illustrating an example of processing in the exemplary embodiment.
Figure 7:
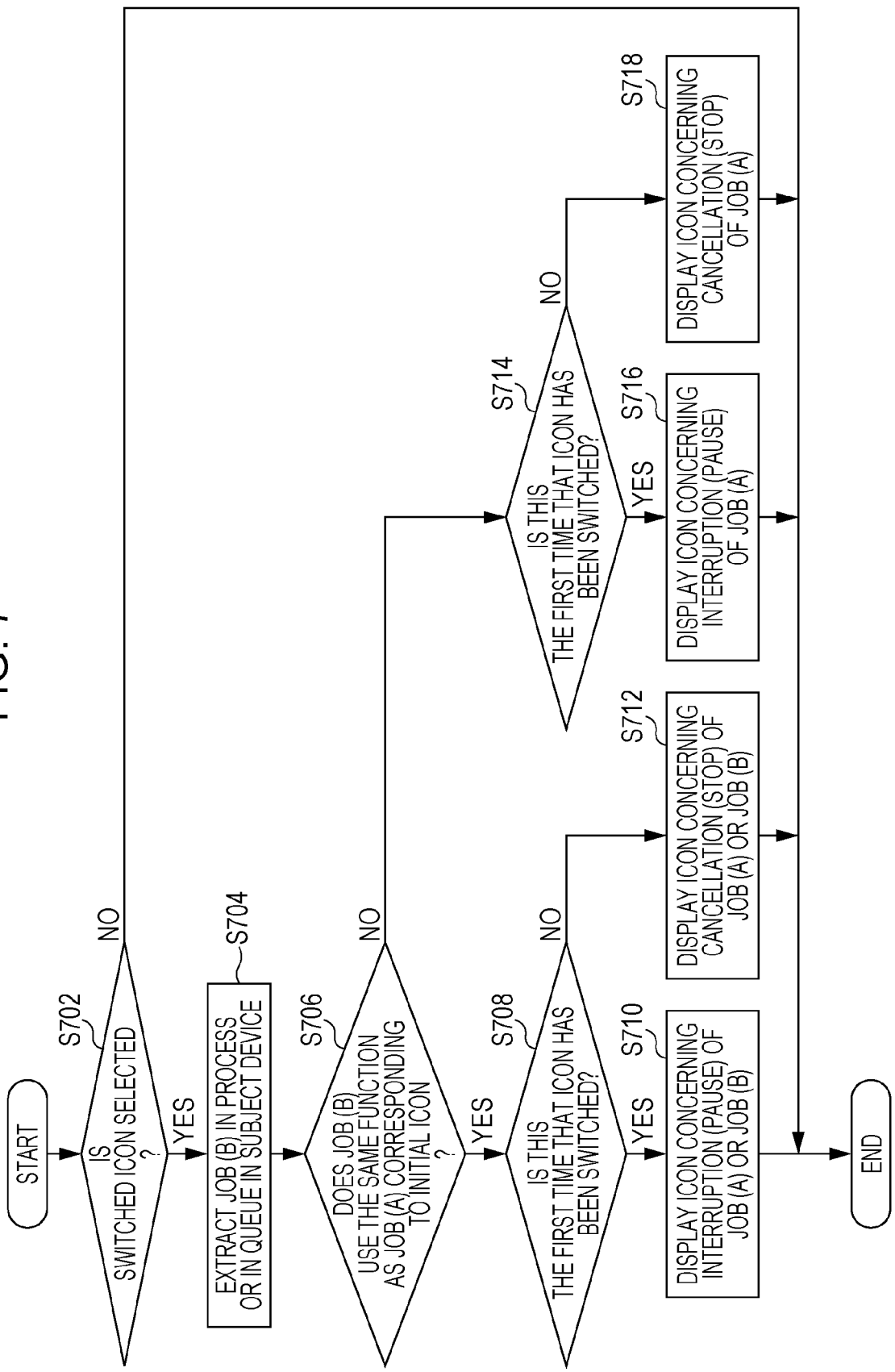
FIG. 7 is a flowchart illustrating an example of processing in the exemplary embodiment.

In step S314, switched icon processing is executed. As step S314, the processing in the flowchart of FIG. 5, 6, or 7 is executed.

In step S316, the device-state detecting module 126 detects the state of the device.

In step S318, it is judged whether the detected state matches the state indicated in the state field 432 of the switching rule table 400. If the detected state matches the state indicated in the state field 432, the process proceeds to step S320. If the detected state does not match the state indicated in the state field 432, the process returns to step S314.

In step S320, the icon switched in step S312 is switched to the icon (C) indicated in the icon (C) field 434 of the switching rule table 400.

In step S322, switched icon processing is executed. As step S322, the processing in the flowchart of FIG. 5, 6, or 7 is executed.

In step S324, it is judged whether processing corresponding to the icon selected in step S304 has finished. If processing has finished, the process proceeds to step S326. If processing has not finished, the process returns to step S322.

In step S326, the icon switched in step S320 is switched to the icon (A) indicated in the icon (A) field 410 of the switching rule table 400. Step S326 is the same processing as that for returning the screen of the device to the initial screen.

In step S328, processing corresponding to the selected icon is executed.

FIG. 5 is a flowchart illustrating an example of processing in the exemplary embodiment. Processing in FIG. 5 is an example of steps S314 and S322 in the flowchart of FIG. 3B.

In step S502, it is judged whether the switched icon is selected. If the switched icon is selected, the process proceeds to step S504. If the switched icon is not selected, the processing is terminated.

In step S504, the content corresponding to the selected icon is displayed. However, other icons, that is, icons that are selectable by the user, are not displayed at the position of the selected icon.

FIG. 6 is a flowchart illustrating an example of processing in the exemplary embodiment. Processing in FIG. 6 is an example of steps S314 and S322 in the flowchart of FIG. 3B.

In step S602, it is judged whether the switched icon is selected. If the switched icon is selected, the process proceeds to step S604. If the switched icon is not selected, the processing is terminated.

In step S604, it is judged whether this is the first time that the icon has been switched. If this is the first time, the process proceeds to step S606. If this is not the first time, the process proceeds to step S608. In the case of step S314 in FIG. 3B, the result of step S604 becomes YES. In the case of step S322 in FIG. 3B, the result of step S604 becomes NO.

In step S606, an icon concerning the interruption (pause) of the job corresponding to the initial icon is displayed. That is, if this is the first time that the icon has been switched, a "resume" icon is displayed. If the user selects the "resume" icon, processing can be restarted.

In step S608, an icon concerning the cancellation (stop) of the job corresponding to the initial icon is displayed. That is, if this is not the first time that the icon has been switched, a "delete" icon is displayed. If the user selects the "delete" icon, processing is canceled.

FIG. 7 is a flowchart illustrating an example of processing in the exemplary embodiment. Processing in FIG. 7 is an example of steps S314 and S322 in the flowchart of FIG. 3B.

In step S702, it is judged whether the switched icon is selected. If the switched icon is selected, the process proceeds to step S704. If the switched icon is not selected, the processing is terminated.

In step S704, a job (B) in process or in a queue in the subject device is extracted.

In step S706, it is judged whether the job (B) extracted in step S704 uses the same function as a job (A) corresponding to the initial icon. If the job (B) uses the same function, the process proceeds to step S708. If the job (B) does not use the same function, the process proceeds to step S714. As discussed above, examples of "jobs using the same function" are: (1) the job (A) and the job (B) are the same type of processing, such as print processing, and (2) the function used by one job is also used by another job, such as the job (A) is copy processing and the job (B) is print processing and they both use the print function.

In step S708, it is judged whether this is the first time that the icon has been switched. If this is the first time, the process proceeds to step S710. If this is not the first time, the process proceeds to step S712.

In step S710, an icon concerning the interruption (pause) of the job (A) or the job (B) is displayed. If the current user is not authorized to interrupt the job (B), an icon concerning the interruption of the job (A) is displayed.

In step S712, an icon concerning the cancellation (stop) of the job (A) or the job (B) is displayed. If the current user is not authorized to cancel the job (B), an icon concerning the cancellation (stop) of the job (A) is displayed.

In step S714, it is judged whether this is the first time that the icon has been switched. If this is the first time, the process proceeds to step S716. If this is not the first time, the process proceeds to step S718.

In step S716, an icon concerning the interruption (pause) of the job (A) is displayed.

In step S718, an icon concerning the cancellation (stop) of the job (A) is displayed.

Figure 8A:
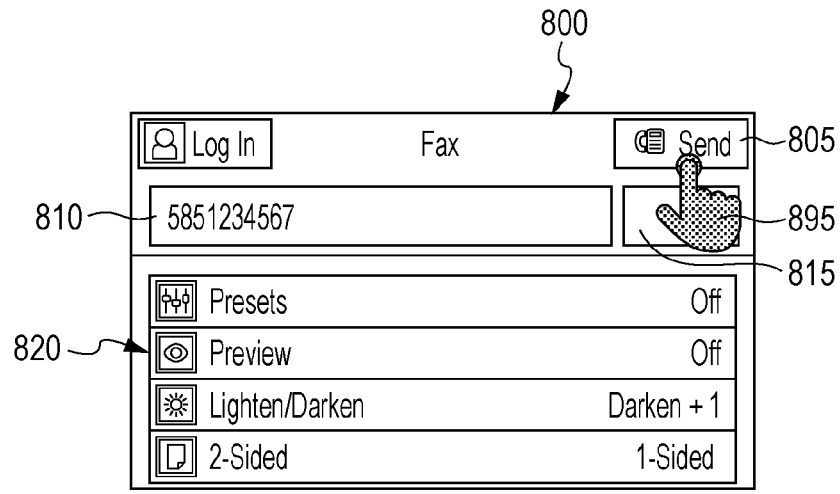
FIGS. 8A, 8B, and 8C illustrate an example of processing in the exemplary embodiment.
Figure 8B:
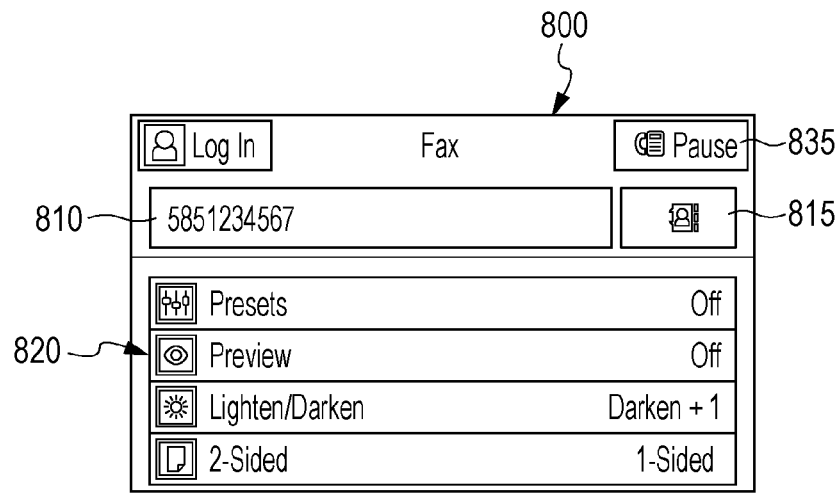
Figure 8C:
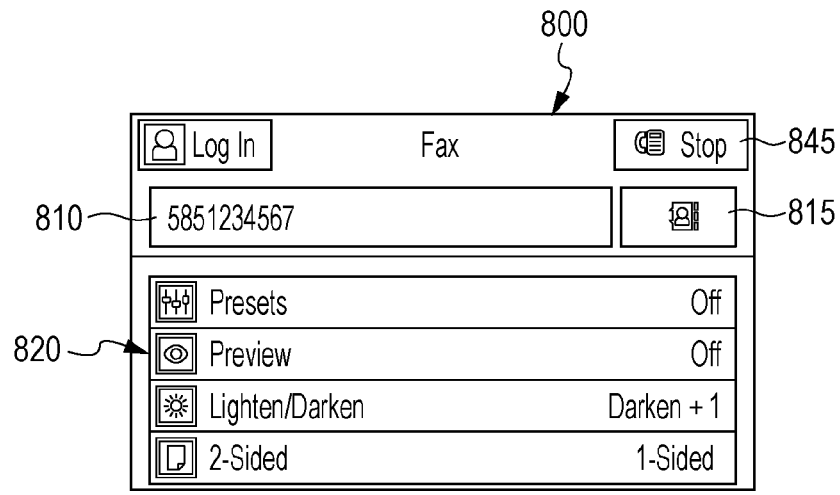

FIGS. 8A through 8C illustrate an example of processing in the exemplary embodiment. More specifically, FIGS. 8A through 8C illustrate screen examples in the image processing apparatus 200 shown in FIG. 2A.

In the example in FIGS. 8A through 8C, every time a user selects an icon, the icon changes its function and appearance. The function and appearance of this icon are dynamically changed in accordance with the state of a subject device.

A screen 800 shown in FIG. 8A is the initial screen concerning fax sending.

On the screen 800 shown in FIG. 8A, a start icon 805, a fax number display field 810, a phone book icon 815, and a settings field 820 are displayed. The start icon 805 is selected with a user's finger 895.

The screen 800 shown in FIG. 8B is the screen on which the start icon 805 has been switched to a pause icon 835.

On the screen 800 shown in FIG. 8B, the pause icon 835, the fax number display field 810, the phone book icon 815, and the settings field 820 are displayed. As a result of the user having selected the start icon 805, a fax sending job has started and the device has entered the state "document reading". The start icon 805 is thus switched to the pause icon 835 in accordance with the third row of the switching rule table 400.

The screen 800 shown in FIG. 8C is the screen on which the pause icon 835 has been switched to a stop icon 845.

On the screen 800 shown in FIG. 8C, the stop icon 845, the fax number display field 810, the phone book icon 815, and the settings field 820 are displayed. As a result of the user having selected the start icon 805, the fax sending job has started and the device has entered the state "image sending". The pause icon 835 is thus switched to the stop icon 845 in accordance with the third row of the switching rule table 400.

Lately, for various types of electronic devices, to enhance their operability and design, as well as to reduce the cost, fewer hardware buttons are disposed, and more icons on a touchscreen, which serves as an operation screen, are used to perform operations. It is however difficult for a user to find a target icon among many icons on the touchscreen, unlike hardware buttons.

After a user has selected an icon corresponding to a certain function on the operation screen, another icon corresponding to another function may be disposed at the same position on the operation screen, that is, the icon selected by the user may be switched to another icon. This may help the user find a target icon easily. For example, in the image processing apparatus 200, which is a multifunction device, when the start icon 805 is selected by a user, it may be replaced by the pause icon 835. This may help the user find the icon for stopping fax sending immediately, that is, the pause icon 835.

The example shown in FIGS. 8A through 8C will be explained in greater detail with reference to FIGS. 9A through 10F.

FIGS. 9A through 9E illustrate an example of processing in the exemplary embodiment.

FIG. 9E shows the user operation and the device operation performed as follows in accordance with a screen 900 shown in FIGS. 9A through 9D.

(1) As shown in FIG. 9A, a user selects a start icon 905 on the screen 900 with a finger 995.

(2) The subject device starts reading a document. Then, the start icon 905 is switched to a pause icon 935, as shown in FIG. 9B.

(3) While the device is reading the document, the user selects the pause icon 935 with the finger 995, as shown in FIG. 9C.

(4) As a result of the user having selected the pause icon 935, the device stops reading the document. Then, as shown in FIG. 9D, a resume icon 950, a delete icon 955, and a job information display field 960 are displayed on the screen 900. That is, the user is instructed to select whether to continue or stop fax sending.

Even if the user has selected the pause icon 935 by mistake by pressing the start icon 905 twice, the user is able to recover from this mistake by selecting the resume icon 950.

The resume icon 950 for giving an instruction to continue fax sending is displayed at a different position from the pause icon 935. Even if the user has selected the pause icon 935 by mistake, processing which is not intended by the user is not executed.

FIGS. 10A through 10F illustrate an example of processing in the exemplary embodiment.

FIG. 10F shows the user operation and the device operation performed as follows in accordance with a screen 1000 shown in FIGS. 10A through 10E.

(1) As shown in FIG. 10A, a user selects a start icon 1005 on the screen 1000 with a finger 1095.

(2) The subject device starts reading a document. Then, the start icon 1005 is switched to a pause icon 1035, as shown in FIG. 10B.

(3) After finishing reading the document, the device starts calling and performing communication. Then, the pause icon 1035 is switched to a stop icon 1045, as shown in FIG. 10C.

(4) While the device is calling and performing communication, the user selects the stop icon 1045 with the finger 1095, as shown in FIG. 10D.

(5) As a result of the user having selected the stop icon 1045, the device stops calling and performing communication and disconnects the line. Then, as shown in FIG. 10E, a job information display field 1060 is displayed on the screen 1000. That is, information is displayed to indicate the fax sending job has been canceled.

Figure 11:
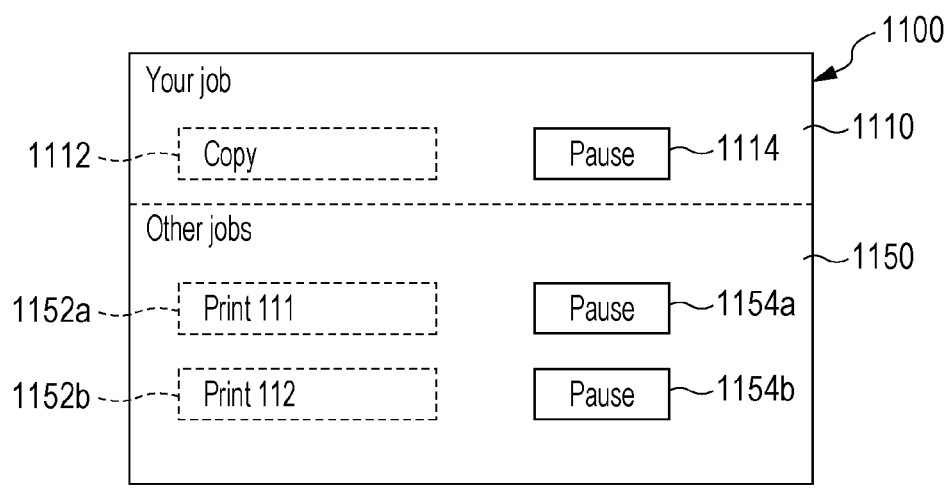
FIG. 11 illustrates an example of processing in the exemplary embodiment.

FIG. 11 illustrates an example of processing in the exemplary embodiment. More specifically, FIG. 11 illustrates an example in which an icon for interrupting first processing and an icon for interrupting second processing are displayed on a screen 1100 of a user device. The first processing is a copy operation selected by a user, and the second processing is two print operations generated in response to print instructions from another device connected to the user device via a line.

On the screen 1100, a user job display field 1110 and an external job display field 1150 are displayed.

In the user job display field 1110, a job name display field 1112 and a pause icon 1114 are displayed. The job name "Copy" is described in the job name display field 1112.

In the external job display field 1150, job name display fields 1152a and 1152b and pause icons 1154a and 1154b are displayed. The job name "Print 111" is described in the job name display field 1152a, and the job name "Print 112" is described in the job name display field 1152b. "111" and "112" represent identification information concerning the jobs so that the jobs can be distinguished from each other. If the user has selected the pause icons 1154a and 1154b, the copy operation, which is the user's job, is prioritized and processed first. If the user is not authorized to interrupt "Print 111" and "Print 112", the pause icons 1154a and 1154b are displayed such that the user is unable to select them.

Figure 12:
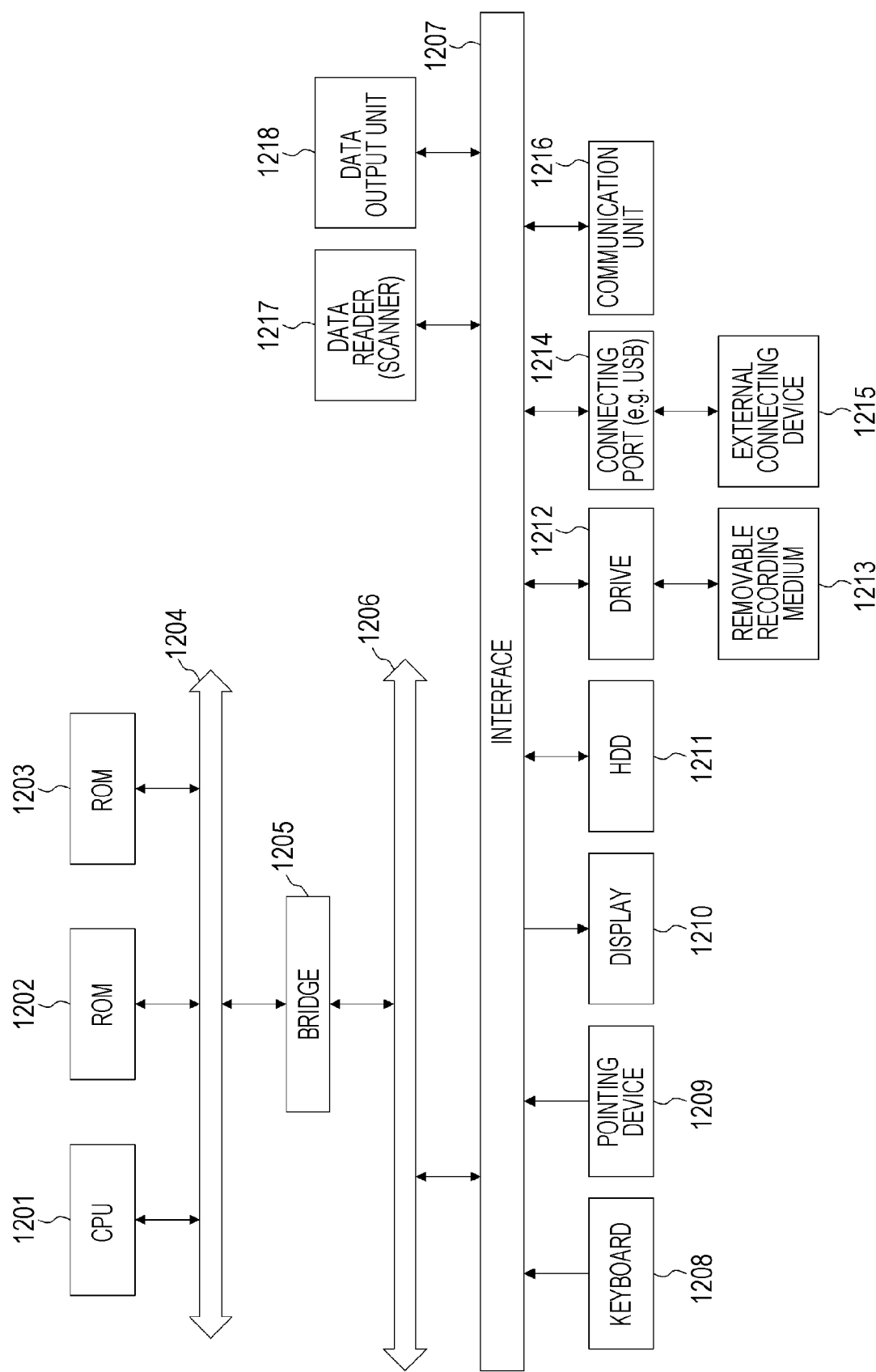
FIG. 12 is a block diagram illustrating an example of the hardware configuration of a computer implementing the exemplary embodiment.

An example of the hardware configuration of the information processing apparatus 100 of the exemplary embodiment will be described below with reference to FIG. 12. The hardware configuration shown in FIG. 12 is implemented as a personal computer (PC), for example, and includes a data reader 1217, such as a scanner, and a data output unit 1218, such as a printer.

A CPU 1201 is a control unit that executes processing in accordance with a computer program describing an execution sequence of the modules of the above-described exemplary embodiment, such as the operation receiving module 110, the display control module 120, the switching (A) module 122, the switching (B) module 124, and the device-state detecting module 126.

A read only memory (ROM) 1202 stores programs and operation parameters used by the CPU 1201. A RAM 1203 stores programs used during the execution of the CPU 1201 and parameters which change appropriately during the execution of the programs. The CPU 1201, the ROM 1202, and the RAM 1203 are connected to one another via a host bus 1204, which is constituted by, for example, a CPU bus.

The host bus 1204 is connected to an external bus 1206, such as a peripheral component interconnect/interface (PCI) bus, via a bridge 1205.

A keyboard 1208 and a pointing device 1209, such as a mouse, are devices operated by an operator. A display 1210, which serves as the display device 130, is a liquid crystal display or a cathode ray tube (CRT), for example, and displays various items of information as text or image information. Alternatively, a touchscreen having both the functions of the pointing device 1209 and the display 1210 may be provided. In this case, to implement the function of the keyboard, a keyboard drawn on a screen (touchscreen, for example) by using software, that is, a so-called software keyboard or screen keyboard, may be used instead of the keyboard 1208, which is a physical keyboard.

A hard disk drive (HDD) 1211 has a built-in hard disk (may alternatively be a flash memory, for example) and drives the hard disk so as to record or play back information or programs executed by the CPU 1201. The HDD 1211 stores data concerning received operations and concerning the state of a device, for example. Various other items of data and various other computer programs are also stored in the HDD 1211.

A drive 1212 reads data or a program recorded in a removable recording medium 1213, such as a magnetic disk, an optical disc, a magneto-optical disk, or a semiconductor memory, and supplies the read data or program to the RAM 1203 via an interface 1207, the external bus 1206, the bridge 1205, and the host bus 1204. The removable recording medium 1213 may also be used as a data recording region.

A connecting port 1214 is a port for connecting the PC to an external connecting device 1215, and has a connecting portion, such as a universal serial bus (USB) port or an IEEE1394 port. The connecting port 1214 is connected to, for example, the CPU 1201, via the interface 1207, the external bus 1206, the bridge 1205, and the host bus 1204. A communication unit 1216 is connected to a communication line and executes data communication processing with an external source. The data reader 1217 is, for example, a scanner, and executes processing for reading documents. The data output unit 1218 is, for example, a printer, and executes processing for outputting document data.

In the above-described exemplary embodiment, concerning elements implemented by a software computer program, such a computer program is read into a system having the hardware configuration shown in FIG. 12, and the above-described exemplary embodiment is implemented by a combination of software and hardware resources.

The hardware configuration of the information processing apparatus 100 shown in FIG. 12 is only an example, and the exemplary embodiment may be configured in any manner in which the modules described in the exemplary embodiment are executable. For example, as a processor, a graphics processing unit (GPU) or a general-purpose computing on graphics processing unit (GPGPU) may be used. Some modules may be configured as dedicated hardware (for example, an application specific integrated circuit (ASIC) or a field-programmable gate array (FPGA)), or some modules may be installed in an external system and be connected to the PC via a communication line. A system, such as that shown in FIG. 12, may be connected to a system, such as that shown in FIG. 12, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, and a multi-function device.

The above-described program may be stored in a recording medium and be provided. The program recorded on a recording medium may be provided via a communication medium. In this case, the above-described program may be implemented as a "non-transitory computer readable medium storing the program therein" in the exemplary embodiment.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. The program may be recorded in any form, for example, it may be compressed or encrypted, as long as it can be reconstructed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor, configured to:
        display icons on a screen;
        when a first icon displayed on the screen is selected, switch the first icon being used for executing a first function of a device to a second icon, wherein the second icon is used for executing a second function of the device different from the first function, and wherein the device enters a first state in response to the first icon being selected; and
        when the device shifts to a second state from the first state, switch the second icon to a third icon on the screen, wherein the third icon is used for executing a third function of the device different from the second function.

2. The information processing apparatus according to claim 1, wherein, if the device remains in the first state, the processor does not switch the second icon to the third icon on the screen.

3. The information processing apparatus according to claim 1, wherein, as the second function or the third function, the processor sets a function of interrupting or stopping processing to be generated when the first icon is selected.

4. The information processing apparatus according to claim 3, wherein, if, in addition to first processing, which is the processing to be generated when the first icon is selected, second processing different from the first processing is currently in the device, the processor sets a function of interrupting or stopping the first processing as the second function or the third function.

5. The information processing apparatus according to claim 4, wherein the first processing and the second processing use an identical function in the device.

6. The information processing apparatus according to claim 3, wherein, if, in addition to first processing, which is the processing to be generated when the first icon is selected, second processing different from the first processing is currently in the device, the processor sets a function of interrupting or stopping the second processing as the second function or the third function.

7. The information processing apparatus according to claim 6, wherein the first processing and the second processing use an identical function in the device.

8. The information processing apparatus according to claim 6, wherein, if the first processing and the second processing do not use an identical function in the device, the processor does not set a function of interrupting or stopping the second processing as the second function or the third function.

9. The information processing apparatus according to claim 1,
    wherein the first icon corresponds to start executing a designated job,
    wherein the second icon corresponds to interrupting the designated job while the device is in the first state, and
    wherein the third icon corresponds to cancellation of the designated job while the device is in the second state.

10. A non-transitory computer readable medium storing a program causing a computer to execute a process, the process comprising:
    displaying icons on a screen;
    when a first icon displayed on the screen is selected, switching the first icon being used for executing a first function of a device to a second icon, wherein the second icon is used for executing a second function of the device different from the first function, and wherein the device enters a first state in response to the first icon being selected; and
    when the device shifts to a second state from the first state, switching the second icon to a third icon on the screen, wherein the third icon is used for executing a third function of the device different from the second function.

11. An information processing apparatus comprising:
    display means for displaying icons on a screen;
    first switching means for switching, when a first icon displayed on the screen is selected, the first icon being used for executing a first function of a device to a second icon, wherein the second icon is used for executing a second function of the device different from the first function, and wherein the device enters a first state in response to the first icon being selected; and
    second switching means for switching, when the device shifts to a second state from the first state, the second icon to a third icon on the screen, wherein the third icon is used for executing a third function of the device different from the second function.

* * * * *